US009160986B2

(12) United States Patent
Nagaoka et al.

(10) Patent No.: US 9,160,986 B2
(45) Date of Patent: Oct. 13, 2015

(54) DEVICE FOR MONITORING SURROUNDINGS OF A VEHICLE

(75) Inventors: Nobuharu Nagaoka, Saitama (JP); Makoto Aimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 13/884,732

(22) PCT Filed: Nov. 9, 2011

(86) PCT No.: PCT/JP2011/006276
§ 371 (c)(1),
(2), (4) Date: May 10, 2013

(87) PCT Pub. No.: WO2012/066751
PCT Pub. Date: May 24, 2012

(65) Prior Publication Data
US 2013/0229525 A1    Sep. 5, 2013

(30) Foreign Application Priority Data

Nov. 16, 2010 (JP) ................. 2010-256296

(51) Int. Cl.
  H04N 7/18      (2006.01)
  G08G 1/16      (2006.01)
  G06K 9/00      (2006.01)
(52) U.S. Cl.
  CPC ............ *H04N 7/183* (2013.01); *G06K 9/00805* (2013.01); *G08G 1/163* (2013.01)
(58) Field of Classification Search
  CPC ....... G01S 13/931; G01S 13/93; B60Q 1/525; B62D 1/00; B62D 1/02; G06K 9/00805; G06K 9/00791; G05D 1/0246
  See application file for complete search history.

(56) References Cited

U.S. PATENT DOCUMENTS 6,327,536 B1    12/2001    Tsuji et al.
7,949,151 B2    5/2011     Taniguchi et al.
(Continued)

FOREIGN PATENT DOCUMENTS

EP    2 224 743 A1    9/2010
JP    2001-006096 A    1/2001
(Continued)

OTHER PUBLICATIONS

M. Bertozzi et al., "A Symmetry-based Validator and Refinement System for Pedestrian Detection in Far infrared Images", Proceedings of the 2007 IEEE Intelligent Transportation Systems Conference, Seattle, WA, Sep. 30-Oct. 3, 2007, pp. 155-160.
(Continued)

*Primary Examiner* — Victor Kostak
(74) *Attorney, Agent, or Firm* — Carrier Blackman & Associates, P.C.; Joseph P. Carrier; Jeffrey T. Gedeon

(57) ABSTRACT

A device for monitoring surroundings of a vehicle mounted in a vehicle, captures an image of surroundings of the vehicle, extracts from the captured image an image area for a predetermined part of a desired type of object, and sets a predetermined area below the extracted image area. The device extracts candidates for the desired type of object present outside the vehicle based on the predetermined area and determines, for each of the extracted object candidates, whether the object candidate is the desired type of object. When no pattern different from the background is captured in the predetermined area, or when a pattern different from the background is captured only in one of a first and a second areas, then the object in the image area is excluded from the candidates for the desired type of object. Thus, a pedestrian, for example, can be distinguished from an artificial structure.

6 Claims, 4 Drawing Sheets

(56) References Cited

U.S. PATENT DOCUMENTS

| | | | |
|---|---|---|---|
| 7,982,748 B2 | 7/2011 | Taniguchi et al. | |
| 8,005,266 B2 | 8/2011 | Saka et al. | |
| 8,144,195 B2 | 3/2012 | Nagaoka et al. | |
| 8,284,253 B2 | 10/2012 | Nagaoka et al. | |
| 2002/0048388 A1* | 4/2002 | Hagihara et al. | 382/107 |
| 2005/0004762 A1* | 1/2005 | Takahama et al. | 701/301 |
| 2005/0063565 A1* | 3/2005 | Nagaoka et al. | 382/104 |
| 2005/0131607 A1* | 6/2005 | Breed | 701/45 |
| 2005/0169529 A1* | 8/2005 | Owechko et al. | 382/190 |
| 2006/0095207 A1* | 5/2006 | Reid | 701/301 |
| 2007/0177011 A1* | 8/2007 | Lewin et al. | 348/118 |
| 2007/0206849 A1* | 9/2007 | Sakata et al. | 382/157 |
| 2009/0066490 A1 | 3/2009 | Mitzutani et al. | |
| 2009/0074249 A1* | 3/2009 | Moed et al. | 382/104 |
| 2010/0020170 A1* | 1/2010 | Higgins-Luthman et al. | 348/135 |

FOREIGN PATENT DOCUMENTS

| | | |
|---|---|---|
| JP | 2003-016429 A | 1/2003 |
| JP | 2003-284057 A | 10/2003 |
| JP | 2006-084218 A | 3/2006 |
| JP | 2007-111161 A | 5/2007 |
| JP | 2007-241740 A | 9/2007 |
| JP | 2007-264778 A | 10/2007 |
| JP | 2007-310705 A | 11/2007 |
| JP | 2007-310706 A | 11/2007 |
| JP | 2007-328630 A | 12/2007 |
| JP | 2007-334751 A | 12/2007 |
| JP | 2008-021034 A | 1/2008 |
| JP | 2008-065756 A | 3/2008 |
| JP | 2008-276787 A | 11/2008 |
| JP | 4486997 B2 | 6/2010 |

OTHER PUBLICATIONS

M. Bertozzi et al., "Shape-based pedestrian detection and localization", Intelligent Transportation Systems, 2003 IEEE, Oct. 12-15, 2003, vol. 1, Oct. 12, 2003, pp. 328-333, Piscataway, NJ.

Guanglin Ma et al., "A Symmetry Search and Filtering Algorithm for Vision Based Pedestrian Detection System", SAE Technical paper, Apr. 14, 2008, pp. 1-7.

Extended European Search Report dated May 27, 2014 issued in corresponding EP Patent Application 11841502.5.

* cited by examiner (a) PRESENT IMAGE (b) PAST IMAGE

DEVICE FOR MONITORING SURROUNDINGS OF A VEHICLE

TECHNICAL FIELD

The present invention relates to a device which monitors surroundings of a vehicle, and more specifically to a device capable of easily and efficiently distinguishing and detecting a desired type of object when monitoring surroundings of a vehicle.

BACKGROUND ART

Conventionally, there has been proposed a device which extracts a variety of objects present in surroundings of a vehicle. According to a method described in Patent Literature 1 below, a distance from a vehicle to an object is measured on the basis of a temporal rate of change of the size of a local area which is set as an area including a part of the object that moves relatively little within an image obtained by an infrared camera mounted in a vehicle.

CITATION LIST

Patent Literature

Patent Literature 1: Japanese Patent No. 4486997

SUMMARY OF THE INVENTION

Problems to be Solved

In the aforementioned method, an upper body area of a pedestrian including its head is set as a local area including the part of the object whose movement is relatively small. The head of a living body such as a pedestrian has a relatively high temperature and thus may be detected easily by an imaging device such as a far-infrared camera. The distance to the object can be measured satisfactorily with a single imaging device with the use of the local area.

However, there can be a heat source such as a street light having a shape similar to the head of a pedestrian in the surroundings of a vehicle. An artificial structure such as the street light can be erroneously detected as a living body such as a pedestrian even when the far-infrared camera is used as mentioned above.

Therefore, an object of the present invention is to improve the accuracy of detecting a desired type of object by decreasing the possibility of erroneously detecting things other than the desired type of object as the desired type of object.

Solution to the Problems

According to one aspect of the present invention, a vehicle surroundings monitoring device includes an imaging unit which is mounted in a vehicle and captures an image of the surroundings of a vehicle, a unit which extracts an image area for a predetermined part of a desired type of object in the captured image, a unit which sets a predetermined area below the extracted image area, an object candidate extracting unit which extracts, on the basis of the predetermined area, a candidate for the desired type of object present outside the vehicle, and a determination unit which determines whether the object candidate is the desired type of object for each object candidate extracted. When no patterns that differ from the background are captured in the predetermined area, or when a pattern that differs from the background is captured only in one of a first and a second areas each of which is a half of a predetermined area that is divided into the right and left in the horizontal direction of the captured image, the object candidate extracting unit excludes the object(s) in the image area with the predetermined area from the candidates for the desired type of object.

When the desired type is a pedestrian, the extracted image area for the head of the pedestrian is sometimes in fact an artificial structure having a similar shape such as a street light. However, when the image area includes a head of a pedestrian, a body and legs below the head would have a substantially symmetrical structure. When the image area includes an artificial structure such as a street light, a post or the like on the lower side of the street light would not have a symmetrical structure in most cases.

The present invention is made in view of such finding. That is, the predetermined area below the extracted image area is examined to exclude an object within the predetermined area from the candidates for the desired type of object when no pattern is captured in the predetermined area, or when some pattern is captured only in one of the left side and the right side of the predetermined area. As a result, an object such as a pedestrian can be distinguished from an artificial structure such as a street light with a relatively simple operation.

The operation for determining a type of the extracted object candidate, that is, determining whether the object candidate is a human such as a pedestrian or an artificial structure such as a building, generally includes image processing for examining a shape characteristic of an object, and image processing for examining the behavior of the object by tracking the object in time sequence. Thus, the operation requires a relatively high operational load. The operational load would increase when such type determination process is performed on all the extracted object candidates. According to the present invention, the operational load of the type determination process can be reduced by performing the type determination process after exclusion in the aforementioned manner.

According to an embodiment of the present invention, the imaging unit is an infrared camera whereas the extracted image area is a high-intensity area having an intensity value higher than a predetermined value in the captured image. The object candidate extracting unit examines left-right symmetry of the object in the first and the second areas on the basis of the intensity value in each of the first and the second areas and, when determination is made that the left-right symmetry of the object is low, excludes the object in the image area from the candidates for the desired type of object. As a result, the candidate for the desired type of object can be extracted more accurately with a simpler operation on the basis of the intensity value with the use of the infrared camera.

According to an embodiment of the present invention, the object candidate extracting unit determines that the left-right symmetry of the object is low when a difference between the sum of the intensity values of pixels in the first area and the sum of the intensity values of pixels in the second area is not smaller than a predetermined value, or when a difference between the variance of the intensity values of the pixels in the first area and the variance of the intensity values of the pixels in the second area is not smaller than a predetermined value. Thus, the left-right symmetry between the first and the second areas can be determined using the intensity values, whereby the candidate for the desired type of object can be extracted more accurately with the simpler operation.

The other features and advantages of the present invention will become apparent from the detailed description to be given hereinafter.

DESCRIPTION OF EMBODIMENTS

Figure 1:
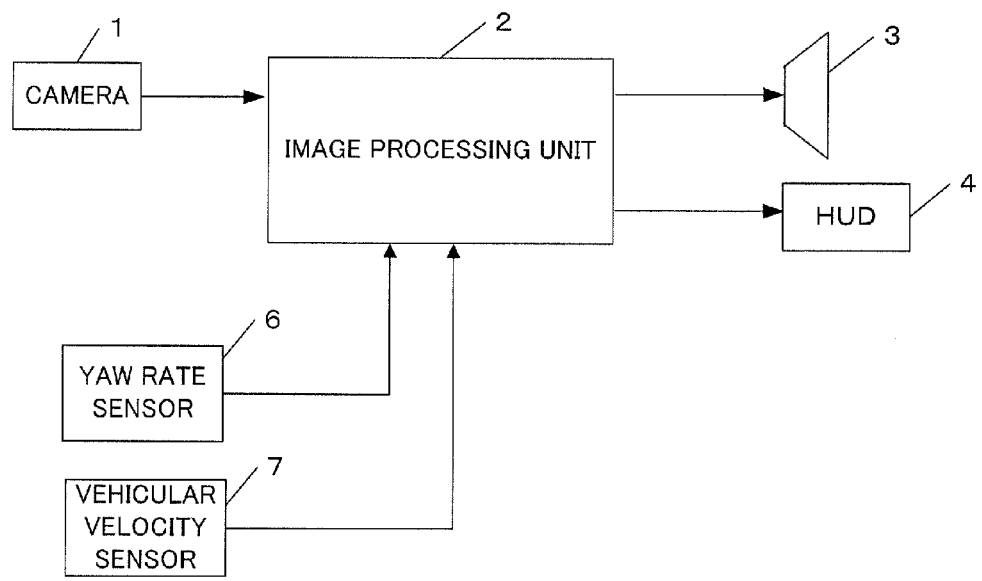
FIG. 1 is a block diagram illustrating a configuration of a vehicle surroundings monitoring device according to an embodiment of the present invention.

Embodiments of the present invention will now be described with reference to the drawings. FIG. 1 is a block diagram illustrating a configuration of a device which monitors the surroundings of a vehicle according to an embodiment of the present invention. The device includes an infrared camera 1 which is mounted in a vehicle and can detect a far-infrared ray, an image processing unit 2 which detects an object in the surroundings of the vehicle on the basis of the image data captured by the camera 1 and determines a type of the object, a speaker 3 which provides an alarm by sound (speech) on the basis of the result of the determination, and a head-up display (hereinafter referred to as an HUD) 4 which displays the image captured by the imaging with the camera 1 and displays the alarm on the basis of the result of the determination. The surroundings monitoring device further includes a yaw rate sensor 6 which detects a yaw rate of the vehicle, and a vehicular velocity sensor 7 which detects a traveling speed (vehicular velocity) of a vehicle. A detection result by these sensors is sent to the image processing unit 2 and is used for a predetermined image processing as needed.

Figure 2:
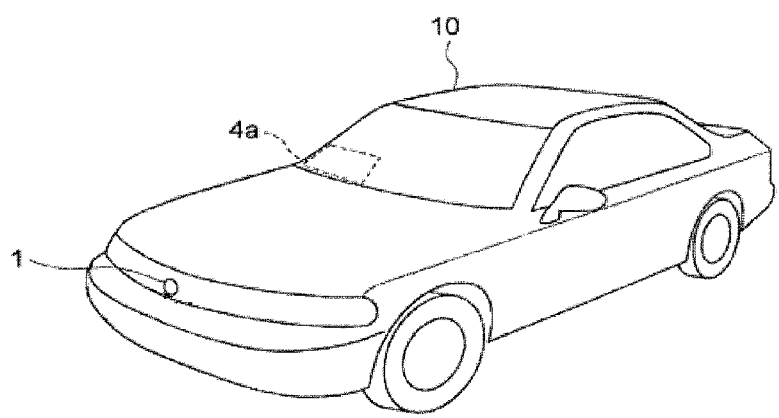
FIG. 2 is a diagram for illustrating a mounting position of a camera according to an embodiment of the present invention.

In the present embodiment, as illustrated in FIG. 2, the camera 1 is disposed at a front part of the vehicle 10 on a central axis thereof running through the center of the vehicle width in order to capture an image in front of the vehicle 10. The infrared camera 1 has a characteristic that the higher the temperature of an object is, the higher the level of an output signal of the camera is (that is, the intensity in a captured image would increase).

The image processing unit 2 includes an A/D conversion circuit which converts an input analog signal into a digital signal, an image memory which stores a digitized image signal, a central operation processing unit (CPU) which performs various operation process, a RAM (random access memory) used by the CPU at the time of operation to store data, a ROM (read-only memory) which stores a program performed by the CPU as well as data (including a table and a map) used by the CPU, and an output circuit which outputs a drive signal for the speaker 3 and a display signal for the HUD 4, for example. The output signal from the camera 1 is converted into a digital signal and is input to the CPU. As illustrated in FIG. 2, the HUD 4 is provided on a front window of the vehicle 10 such that a screen 4a is displayed at a position in front of a driver, whereby the driver can visually recognize the screen displayed on the HUD 4.

In lieu of HUD 4, a display unit may be mounted to a dashboard. For example, a display unit of a so-called navigation device (not shown) can be used as the display unit. As is widely known, the navigation device is a device which can detect a current position of a vehicle, calculate an optimum route to a destination, and display the current position and the route on map information.

Figure 3:
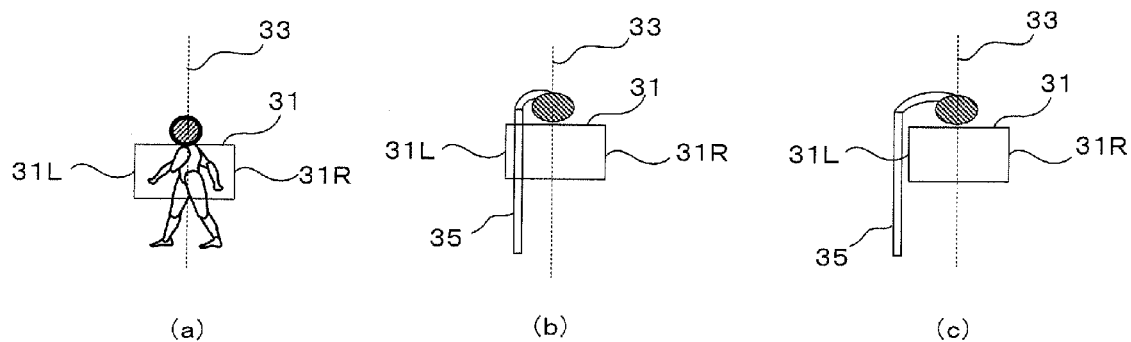
FIGS. 3(a) to 3(c) are diagrams illustrating a set-up embodiment of a lower area according to an embodiment of the present invention.

FIGS. 3(a) to 3(c) illustrate the basic idea of the present invention. FIG. 3(a) is a diagram schematically illustrating a pedestrian captured by a camera, while FIGS. 3(b) and 3(c) are diagrams schematically illustrating a street light captured by a camera. A head of the pedestrian indicated by a shaded area in FIG. 3(a) is often an exposed part of a human body and thus can be extracted relatively stably as a high-temperature object, that is, an image area with high intensity. On the other hand, as indicated by shaded areas in FIGS. 3(b) and 3(c), the street light is a heat source and, therefore, is highly possibly extracted as the high-temperature object, that is, the image area with high intensity.

Thus, in the present embodiment, the desired type of object is set to a pedestrian, and an image area for a head of the pedestrian is extracted. A high-intensity area with an intensity value higher than a predetermined value can be extracted as the image area for the head of the pedestrian by using the infrared camera. As mentioned above, however, there can be a case where the extracted image area (the high-intensity area in the present embodiment) indicates not the head of the pedestrian but an artificial structure such as a street light.

Therefore, in the present invention, a predetermined lower area 31 is set below the extracted high-intensity area. The lower area 31 is set symmetrically about a reference line 33 serving as a center and extending in a vertical direction along the center of gravity or the center of the extracted high-intensity area. That is, the lower area 31 is divided into two parts, a left side (first) area 31L and a right side (second) area 31R.

The lower-body below the head (a torso and legs) of a pedestrian has a substantially symmetrical structure. Therefore, as illustrated in FIG. 3(a), when the high-intensity area indicated by the shaded area represents the head of the pedestrian, it is expected that some pattern including the torso of the pedestrian (some object different from the background) is captured in both of the left side area 31L and the right side area 31R of the lower area 31 below the head.

On the other hand, a column (post) part 35 below a heat source part (the shaded part) of the street light as illustrated in FIGS. 3(b) and 3(c) does not have a symmetrical structure about the reference line 33, whereby a pattern is captured only in one of the left side area 31L and the right side area 31R as illustrated in FIG. 3(b) or is captured neither in the left side area 31L nor the right side area 31R as illustrated in FIG. 3(c). In the latter case, it is only the background part such as the sky which is captured in the lower area 31.

Accordingly, in the present invention, the desired type of object (the pedestrian in the present embodiment) is detected distinguishably from the object other than the desired type of object (the artificial structure such as the street light in the present embodiment) on the basis of the presence of a pattern or the left-right symmetry thereof in the lower area 31 set below the high-intensity area.

Figure 4:
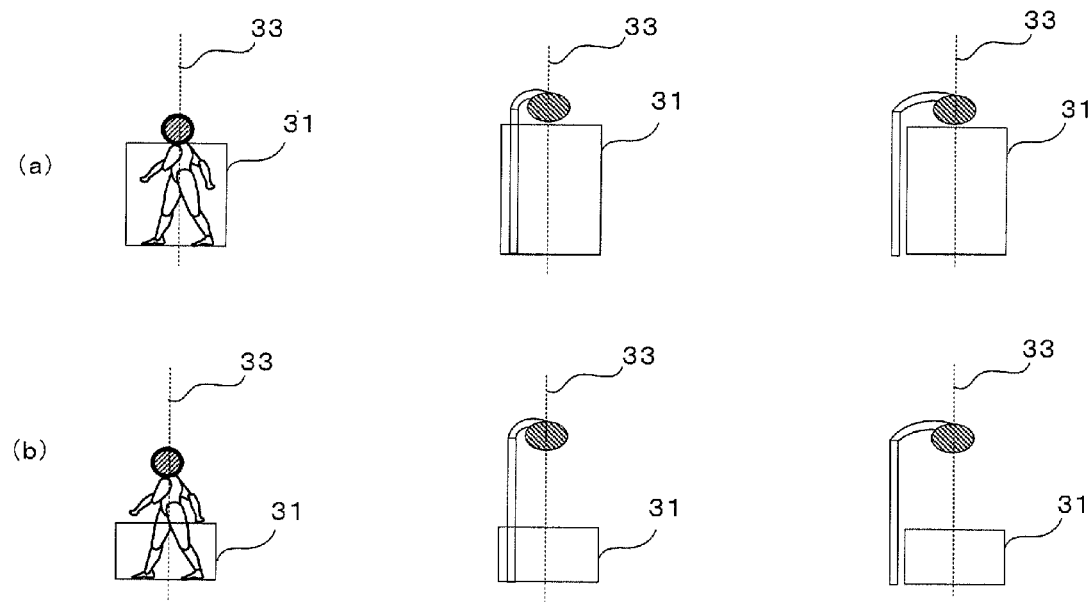
FIGS. 4(a) and 4(b) are diagrams illustrating another set-up embodiment of the lower area according to an embodiment of the present invention.

As illustrated in the figure, the pedestrian has a substantially symmetrical structure about the reference line 33 from the torso to the legs, whereas the post 35 of the street light down to the ground does not have a symmetrical structure. As a result, the lower area 31 set in the aforementioned manner needs only be below the shaded high-intensity area and not be in contact therewith. As illustrated in FIG. 4(a), for example, an area below the high-intensity area down to where it contacts the ground may be set as the lower area 31. In this case, a foot of the pedestrian or a point of contact between the post of the street light and the ground is extracted as an edge, whereby an area in the vertical direction from the edge to the high-intensity area can be set as the lower area 31. Alternatively, as illustrated in FIG. 4(b), an area in contact with the ground away from the high-order area may be set as the lower area 31.

Moreover, the lengths of the lower area 31 in a horizontal (left-and-right) direction and a vertical (up-and-down) direction can be set to an arbitrarily predetermined appropriate value. The length of the lower area in the horizontal direction is set greater than the width of the body of the pedestrian in FIGS. 3(a) to 4(b) but may also be set shorter than the width of the torso, in which case the left-right symmetry of the torso of the pedestrian would likewise be exhibited in the lower area 31.

Figure 5:
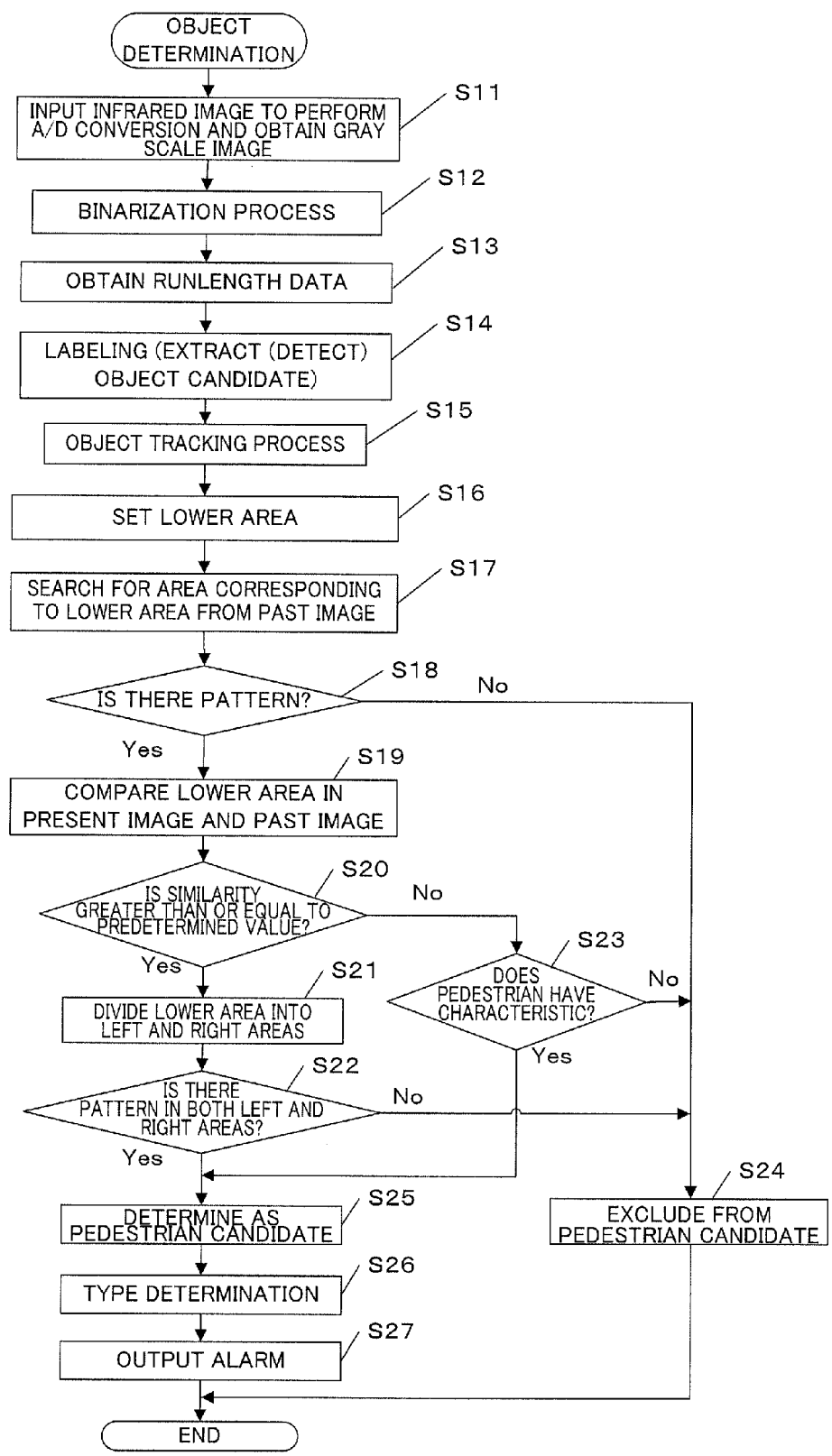
FIG. 5 is a flowchart of an object determination process performed by an image processing unit according to an embodiment of the present invention.

FIG. 5 is a flowchart illustrating a process performed by the image processing unit 2 according to an embodiment of the present invention. The process is performed at a predetermined time interval. In the present embodiment, as illustrated in FIGS. 3(a) to 3(c), it is assumed that the lower area is set in contact with the area extracted as the high-intensity area. Moreover, as described above, it is assumed that the desired type of object is the pedestrian.

In step S11, an output signal from the far-infrared camera 1 (namely, data of a captured image) is received as an input, undergoes A/D conversion, and is stored in the image memory. The stored image data is a gray scale image having a higher intensity value as the temperature of the object is higher.

In step S12, the gray scale image undergoes a binarization process. Specifically, an area brighter than an intensity threshold ITH is determined to be "1" (white) while an area darker than the intensity threshold is determined to be "0" (black). The intensity threshold ITH can be determined by an arbitrary and appropriate method. An object such as a heat source of a living body or an artificial structure which has a temperature higher than a predetermined temperature is extracted as a white area (high-intensity area) by the binarization process.

In step S13, the binarized image data is converted into run length data. Specifically, in the area that has become the white area by the binarization, the run length data is represented by coordinates of a starting point (the left end pixel of the white area in each pixel line) of the white area in each pixel line (hereinafter referred to as a line) and the length (expressed in a pixel number) from the starting point to an end point (the right end pixel in each line). Here, the y axis is taken in the vertical direction of the image, and the x axis is taken in the horizontal direction of the image. For example, when the white area in a pixel line with the y coordinate of y1 is a line from (x1, y1) to (x3, y1), this line formed of three pixels is expressed by the run length data of (x1, y1, 3).

In step S14, the object is labeled so that a candidate for the desired type of object is extracted. That is, among lines in the form of the run length data, lines having sections that lie on top of one another in the y direction are collectively considered as one object, to which a label is given. As a result, one or a plurality of object candidates is extracted (detected).

Figure 6:
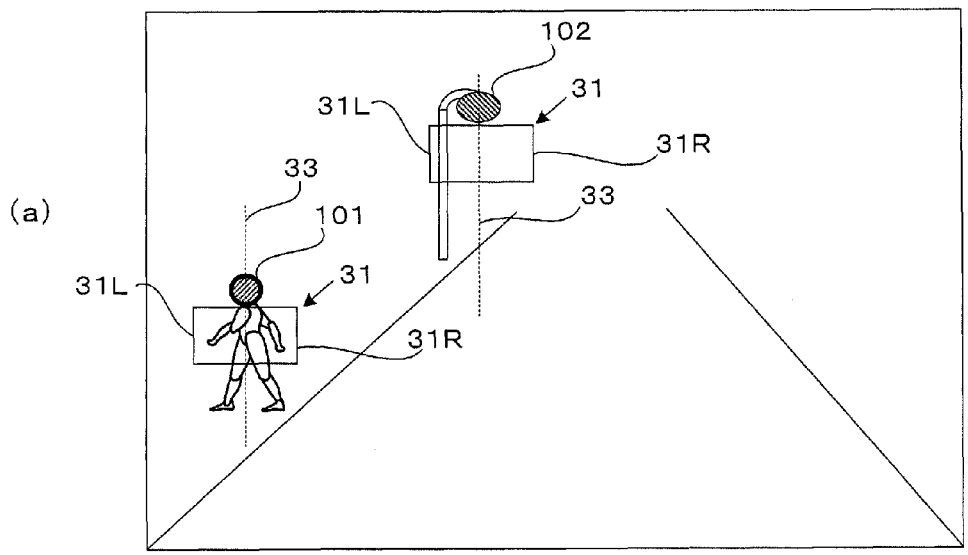
FIGS. 6(a) and 6(b) are diagrams schematically illustrating a present image and a past image according to an embodiment of the present invention.
Figure 6:
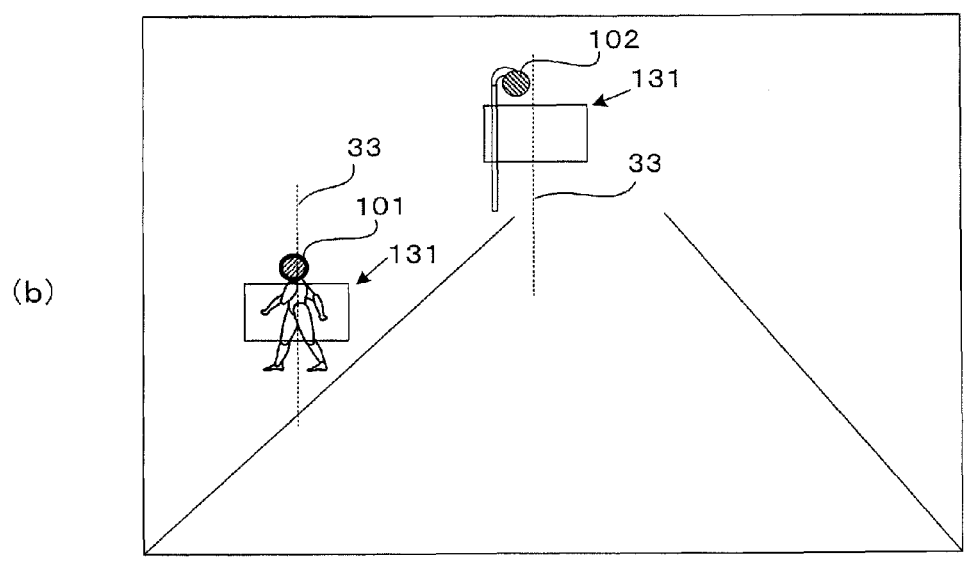

The detected object candidate has temperature higher than a predetermined temperature, thereby possibly including not only a living body such as a human (pedestrian) and an animal but also an artificial structure such as a street light having a heat source. FIG. 6(a) schematically illustrates an embodiment of the image (referred to as a present image) obtained by the process performed this time. In this embodiment, a head 101 of the pedestrian as well as a street light 102 are extracted as the high-temperature objects (namely the high-intensity areas) as indicated by the shaded areas.

In step S15, a tracking process is performed on the object to determine whether or not the object candidate detected this time is identical to an object candidate detected when the process was performed in the past. If the cycle of performing the process is shown by k, for example, whether or not the object candidate detected in step S14 last time (time k−1) is identical to the object candidate detected in step S14 this time (time k) is determined. This determination can be performed by an arbitrary method. For example, as described in JP 2001-6096 A, the object at time k and the object at time k−1 can be determined identical when the difference in coordinates of the center of gravity, in areas, or in aspect ratios of a circumscribed square of the objects is not larger than a predetermined tolerance between the both objects. Alternatively, by using the gray scale image, the identity determination may be performed on the basis of correlation (similarity) between an intensity distribution of the object candidate detected this time within the image area and an intensity distribution of the object detected in the past within the image area candidate. For example, the objects can be determined identical when the difference in the variances of the intensity between the objects is not larger than a predetermined value, indicating that the correlation is high.

FIG. 6(b) schematically illustrates an embodiment of the image (referred to as a past image) obtained prior to FIG. 6(a) (the last time in this embodiment). The head 101 of the pedestrian as well as the street light 102 are extracted as the high-temperature objects (high-intensity areas), namely the object candidates, as indicated by the shaded areas, and are determined to be identical to the objects 101 and 102 illustrated in FIG. 6(a).

In step S16, the lower area 31 described above is set below the high-intensity areas 101 and 102 extracted this time. The lower area 31 is set symmetrical about the reference line 33 extending in the vertical direction in the image through the center of gravity or the center of the detected high-intensity area, namely, the detected high-temperature object. The lower area 31 thus includes the left side area 31L and the right side area 31R.

The lower area 31 is set to have a predetermined size in the present embodiment but may also be set to have the size that varies in accordance with the size of the high-intensity area. For example, the length of the lower area may be set no shorter than the longest part of the high-intensity area in the horizontal direction and set at a predetermined length in the vertical direction.

In step S17, the lower area 31 set in the present image illustrated in FIG. 6(a) for the object candidate determined to be identical in step S16 is used as a mask to search for an area with the highest similarity (highly correlated) to the lower area in the past image illustrated in FIG. 6(b). For example, in the case of the high-intensity area 101 in FIGS. 6(a) and 6(b), the lower area 31 set in FIG. 6(a) is used as the mask, which is superposed and moved downward over the high-intensity area 101 of the image in FIG. 6(b) to search for the area with the highest similarity to the mask. As described above, the area where the difference between the variance of the intensity of the pixels in the mask and the variance of the intensity in the superposed image is the smallest can be searched, and the variance, the difference in which is the smallest between the mask and the superposed image, can be used as an index to indicate the similarity. An area 131 found as a result of the search is illustrated in the past image in FIG. 6(b). The similar process is performed for a high-intensity area 102.

Although not illustrated in FIG. 5, it is preferred, when there is a gap (difference) of not smaller than a predetermined value in the horizontal direction between a line diving the searched area 131 in half so that the divided areas become symmetric and the reference line 33 set on the basis of the high-intensity area 101 in the past image, the object in the high-intensity area is excluded from the pedestrian candidates by proceeding to step S24 without proceeding to step S18. The large "gap" implies, for example, that an object at a different distance is captured overlapping the object in the high-intensity area in either the present image or the past image, thereby degrading the accuracy of calculation of the position (distance) of the pedestrian.

In step S18, it is determined whether some pattern is present in the lower area 31 set in the present image. This step examines the presence of some pattern different from the background in the lower area 31 below the high-intensity area. When the object is the pedestrian having a torso and legs beneath the head, a pattern as described above should be present. Specifically, a pattern different from the background is determined present when the calculated variance of the intensity value of the pixels in the lower area 31 is not smaller than a predetermined value, and that no pattern different from the background is determined to be present if the variance is less than the predetermined value. It may also be determined that the pattern is "not a pedestrian" (such as a utility pole) when the pattern is present (there is some object) only in one of the right and the left areas of the lower area 31 divided thereinto.

When the object is a street light illustrated in FIG. 3(c), for example, there is no pattern but the background such as the sky captured in the lower area 31, whereby the variance of the intensity would be low. On the other hand, when the object is a pedestrian illustrated in FIGS. 3(a), 6(a) and 6(b), a torso is captured (imaged) in the lower area 31, whereby the variance of the intensity would be high. When determination is made that no pattern is present, the object in the high-intensity area accompanied with the lower area 31 is excluded from the pedestrian candidate in step S24. The object excluded from the pedestrian candidate would not be subjected to a subsequent type determination process (step S26). In the embodiment illustrated in FIG. 6(a), the body of the pedestrian and the post of the street light are captured (imaged) in the lower area 31 of the high-intensity area 101 and the lower area 31 of the high-intensity area 102, respectively, whereby it is determined Yes in step S18 to proceed to step S19.

In step S19, the lower area 31 set in the present image is compared to the lower area 131 set in the past image as the result of the search in step S17.

In step S20, as a result of the comparison, determination is made whether the similarity between the lower areas is greater than or equal to a predetermined value. The variance of the intensity can be used as the index that indicates the similarity, as described above. Therefore, upon calculating the variance of the intensity value of the pixels in the lower area 31 in the present image as well as the variance of the intensity value of the pixels in the lower area 131 in the past image, the similarity (correlation) between the lower areas is determined high when the difference in the variances is less than or equal to the predetermined value, and the process proceeds to step S21. The similarity between the two is determined low when the difference in the variances is greater than the predetermined value, in which case the process proceeds to step S23.

In step S21, the lower area 31 in the present image is divided into two parts, namely the right and the left sides, along the reference line 33 serving as the center. In step S22, it is determined whether a pattern different from the background is present in both of the left side area 31L and the right side area 31R of the lower area 31. It is expected that, when the object is the pedestrian, some pattern different from the background would be captured in both of the left side area 31L and the right side area 31R as described above because the body is captured in the lower area 31. When the object is the street light, on the other hand, a pattern would be captured only in one of the left side area 31L and the right side area 31R, if any, as illustrated in the figure. This step thus examines the presence of such pattern in each lower area 31.

Specifically, the variance of the intensity value of the pixels in each of the left side area 31L and the right side area 31R is calculated to examine whether the difference between the variances is greater than or equal to the predetermined value. When the difference is greater than or equal to the predetermined value, the pattern such as the post of the street light is only captured in one of the areas, whereby determination is made that the left-right symmetry between the left side area 31L and the right side area 31R is low. In this case, the process proceeds to step S24 where the object in the high-intensity area accompanied with the lower area 31 is excluded from the pedestrian candidate. On the other hand, when the difference between the variances is less than the predetermined value, some pattern is captured in both of the left side area 31L and the right side area 31R, whereby determination is made that the left-right symmetry between the areas is high. In this case, the process proceeds to step S25 where the object is determined to be the pedestrian candidate.

Alternatively, the sum of the intensity values may be used in place of the variance of the intensity values. The sum of the intensity values of the pixels in the left side area 31L and the sum of the intensity values of the pixels in the right side area 31R are calculated to examine whether the difference between the sums is greater than or equal to a predetermined value. When the difference is greater than or equal to the predetermined value, the pattern is captured only in one of the areas, whereby determination is made that the left-right symmetry is low, and the process proceeds to step S24. When the difference is less than the predetermined value, some pattern is captured in the both areas, whereby determination is made that the left-right symmetry is high, in which case the process proceeds to step S25. Note that, in determining the symmetry, the sum of absolute difference (SAD) may be used in place of or in addition to the variance or the sum of the intensity values.

When the similarity between the lower area 31 in the present image and the lower area 131 in the past image is not greater than or equal to the predetermined value back in step S20, the process proceeds to step S23 where it is examined whether the pedestrian has any unique characteristic. The unique characteristic of the pedestrian can be extracted by an arbitrary method that is appropriate from a viewpoint of a shape or a walk cycle, for example. It can be examined, for example, whether a shape characteristic considered as legs (such as two portions extending in the vertical direction) is extracted from the image area that is extracted, the image area covering from the high-intensity area to the ground, or whether a cyclic characteristic based on the walk is extracted by tracking the image area covering from the high-intensity area to the ground from the past to the present (refer to JP 2007-264778 A, for example). The width of the extracted image area in the horizontal direction can be set to the length of the longest part in the high-intensity area plus a predetermined margin, for example. When no unique characteristic of the pedestrian is extracted, the process proceeds to step S24 where the object is excluded from the pedestrian candidate, whereas when the characteristic is extracted, the process proceeds to step S25 where the object is determined to be the pedestrian candidate.

In step S26, a type determination process is performed to determine whether each pedestrian candidate determined in step S25 is ultimately a pedestrian. It can be specified more accurately whether or not the pedestrian candidate is a pedestrian by this type determination process.

An arbitrary and appropriate method can be used to perform the type determination process. For example, a known pattern matching can be used to determine whether or not the object candidate is a pedestrian by examining the characteristic regarding the shape of the object candidate or examining the behavior or the like of the object candidate through time. The type determination process for a pedestrian can employ a method described in, for example, JP 2007-241740 A, JP 2007-264778 A, JP 2007-334751 A, and the like. In addition to the pedestrian determination, an artificial structure determination and an animal determination may be performed in the type determination process. The object candidate that has not been determined to be a pedestrian can thus be determined whether it is an artificial structure or an animal. In this case, the type determination process for an artificial structure can employ a method described in, for example, JP 2003-016429 A, JP 2008-276787 A, and the like. Moreover, the type determination process for an animal can employ a method described in, for example, JP 2007-310705 A, JP 2007-310706 A, and the like.

Moreover, a distance of the object determined to be a pedestrian by the type determination may be calculated by an arbitrary method that is appropriate. For example, as illustrated in Japanese Patent No. 4486997, by setting a local area including a high-intensity area (which is set as an area with relatively little movement when the object is a pedestrian) and finding a rate of change of the size of the local area in the past image to the local area in the present image, the distance of the object can be calculated on the basis of the rate of change and a vehicular velocity detected by the vehicular velocity sensor 7. As a result, the position of the object relative to an own vehicle can be specified.

In step S27, an alarm related to the object determined to be a pedestrian is given to a driver. For example, the alarm may inform the driver of the distance calculated as described above or may go off when the distance value becomes a predetermined value or less. As illustrated in JP 2001-6096 A, for example, the alarm may also go off when determination is made that there is a high possibility for the object to come in contact with the vehicle by examining the possibility of the contact on the basis of the distance value. The alarm may be given by unit of a sound through the speaker 3 or of a visual display through the HUD 4.

Therefore, in the present invention, the artificial structure such as the street light is excluded from the pedestrian candidate when the desired type is the pedestrian by examining whether some pattern different from the background is present in the lower area below the image area (the high-intensity area in the present embodiment) for the head of the pedestrian, or whether some pattern different from the background is present only in one of the right and the left areas of the lower area divided thereinto. The accuracy of extracting the pedestrian candidate can thus be improved by the relatively simple operation. Moreover, the exclusion process has a role to liberally (roughly) filter the extracted object candidates prior to the type determination process and operates to exclude the object candidate less likely to be the desired type from the subsequent type determination process. As a result, the object candidate that can be the noise in the type determination process can be excluded in advance. The operational load of the type determination process can be decreased by the exclusion process performed prior to the type determination process. Furthermore, there is only one camera required to be mounted in a vehicle, thereby allowing the cost to be decreased.

The lower area 31 is set in contact with the high-intensity area in the aforementioned flow but may also be set to cover the area from the high-intensity area to the ground or set below the high-intensity area at a distance therefrom as described with reference to FIGS. 4(a) and 4(b). In this case, for example in step S16, the portion where the foot or the post of the street light comes in contact with the ground would appear as an edge in the captured image, so that the edge is extracted by searching below the high-intensity area. The lower area 31 may be set to the portion covering from the extracted edge to the lower end of the high-intensity area (the case in FIG. 4(a)) or to the area having a predetermined length above the extracted edge (the case in FIG. 4(b)).

The present embodiment has illustrated a case where the head is extracted as the high-intensity area when the image of the pedestrian is captured. The pedestrian can be detected distinguishably from the artificial structure such as the street light having the heat source which has a similar shape to that of the head of the pedestrian, even when the head of the pedestrian alone is extracted as the high-intensity area. The similar process can be performed when not only the head but the body and the legs of the pedestrian are extracted as the high-intensity area. For example, within the extracted high-intensity area, the portion determined to be a substantially circular area is determined as the head area so that the lower area can be set below the head area.

In the aforementioned embodiment, the image area for the head of the pedestrian can be extracted relatively easily on the basis of the intensity value by using the infrared camera. Alternatively, however, another camera such as a visible camera may be used. In this case, the image area for the head of the pedestrian (such as a circular image area) is likewise extracted by an arbitrary known method so that the lower area may be set below the image area. By using a pixel value in the lower area, it may be determined whether or not a pattern different from the background is captured in the lower area, or whether or not the pattern different from the background is captured in both of the left and the right side areas of the lower area divided thereinto.

Moreover, the aforementioned embodiment has illustrated that the pedestrian candidate can be extracted with more superior accuracy by excluding the artificial structure such as the street light even when the similarity of the objects examined between the present image and the past image is high. It is not always required to examine the similarity of the objects through time, however. In another embodiment, the pedestrian candidate may be determined by setting the lower area in the present image and examining the lower area as described above without examining the similarity. In this case, the operational load can be further reduced because the object needs not be tracked through time.

While the embodiments of the present invention have been described above, the present invention is not limited to these embodiments but may be modified for use without departing from the spirit of the present invention.

REFERENCE SIGNS LIST

1 Infrared camera (imaging unit)
2 Image processing unit
3 Speaker
4 HUD

The invention claimed is:

1. A vehicle surroundings monitoring device comprising:
an imaging unit which is mounted in a vehicle and captures an image of surroundings of the vehicle; and
an image processing unit having a processor and a memory, the image processing unit being configured to: extract possible image areas for a predetermined part of a desired type of object in the captured image;
set a predetermined area below each extracted image area;
when no pattern different from a background is captured in the predetermined area, or when a pattern different from the background is captured only in one of a first and a second areas each of which is a half of the predetermined area divided in a horizontal direction, exclude the extracted area related to said predetermined area and determine candidates for the desired type of object as objects in the remaining extracted image areas;
determine, for each of the candidates, whether the candidate is the desired type of object.

2. The device according to claim 1, wherein the imaging unit is an infrared camera, wherein the image processing unit is configured to extract the possible image areas as high-intensity areas each having an intensity value higher than a predetermined value, and
wherein the image processing unit is configured to determine whether left-right symmetry of an object in the first and the second areas is lower than a predetermined level by examining the left-right symmetry on the basis of intensity values in the first and the second areas, and to exclude the extracted image region related to said first and second areas if the determination is positive.

3. The device according to claim 2, wherein the image processing unit is configured to determine that the left-right symmetry is lower than a predetermined level when a difference between a sum of intensity values of pixels in the first area and a sum of intensity values of pixels in the second area is not smaller than a predetermined value, or when a difference between a variance of the intensity values of the pixels in the first area and a variance of the intensity values of the pixels in the second area is not smaller than a predetermined value.

4. A method of monitoring surroundings of a vehicle, comprising steps of:
capturing an image of surroundings of the vehicle with an imaging unit;
extracting possible image areas for a predetermined part of a desired type of object in the captured image;
setting a predetermined area below each extracted image areas;
when no pattern different from a background is captured in the predetermined area, or when a pattern different from the background is captured only in one of a first and a second areas each of which is a half of the predetermined area divided in a horizontal direction, excluding the extracted area related to said predetermined area and determine candidates for the desired type of objects as objects in the remaining extracted image areas;
determining, for each of the candidates, whether the candidate is the desired type of object.

5. The method according to claim 4, wherein the step of extracting comprises extracting the possible image areas for a predetermined part of a desired type of object as high-intensity areas each having an intensity value higher than a predetermined value, and
wherein the step of excluding comprises:
determining whether left-right symmetry of an object in the first and the second areas is lower than a predetermined level by examining the left-right symmetry on the basis of intensity values in the first and the second areas, and excluding the extracted image region related to said first and second areas if the determination is positive.

6. The method according to claim 5, wherein said excluding an object in the image area comprises:
determining that the left-right symmetry is lower than a predetermined level when a difference between a sum of intensity values of pixels in the first area and a sum of intensity values of pixels in the second area is not smaller than a predetermined value, or when a difference between a variance of the intensity values of the pixels in the first area and a variance of the intensity values of the pixels in the second area is not smaller than a predetermined value.

* * * * *